(12) United States Patent
Rider et al.

(10) Patent No.: US 6,336,271 B1
(45) Date of Patent: Jan. 8, 2002

(54) RETRACTIBLE PEELER

(75) Inventors: Todd Owen Rider; Lance L. Hood, both of Seattle, WA (US)

(73) Assignee: Chef'n Corporation, Seattle, WA (US)

( * ) Notice: Subject to any disclaimer, the term of this patent is extended or adjusted under 35 U.S.C. 154(b) by 0 days.

(21) Appl. No.: 09/668,040

(22) Filed: Sep. 21, 2000

(51) Int. Cl.⁷ ................................................ B26B 1/08
(52) U.S. Cl. ........................................ 30/162; 30/279.6
(58) Field of Search .................... 30/162, 335, 336, 30/123.5, 123.6, 279.6

(56) References Cited

U.S. PATENT DOCUMENTS

| | | | |
|---|---|---|---|
| 2,182,710 A | 12/1939 | Tamke | 30/278 |
| 2,483,750 A | * 10/1949 | Bratrud | 30/162 |
| 2,569,080 A | 9/1951 | Trimble et al. | 30/320 |
| 3,009,245 A | 11/1961 | Senkewitz | 30/155 |
| 3,872,591 A | * 3/1975 | Quenot | 30/162 |
| 4,348,807 A | 9/1982 | Ashdown et al. | 30/123.6 |
| 4,466,561 A | 8/1984 | Slaughter | 224/163 |
| 4,592,140 A | 6/1986 | Chasen | 30/123.7 |
| 4,707,920 A | 11/1987 | Montgomery | 30/294 |
| 4,920,645 A | 5/1990 | Baudouin | 30/162 |
| 4,985,034 A | * 1/1991 | Lipton | 30/162 |
| 5,230,155 A | 7/1993 | Pai | 30/277.4 |
| D374,795 S | 10/1996 | Lie | D7/395 |
| 5,581,834 A | 12/1996 | Collins | 7/118 |
| 5,644,843 A | * 7/1997 | Young | 30/162 X |
| D410,188 S | 5/1999 | Dossett | D8/99 |
| D414,670 S | 10/1999 | Lindén | D8/99 |
| 6,006,433 A | 12/1999 | Baltazar | 30/162 |
| 6,219,923 B1 | * 4/2001 | Sinisi et al. | 30/162 |

* cited by examiner

*Primary Examiner*—Douglas D. Watts
(74) *Attorney, Agent, or Firm*—Seed IP Law Group PLLC

(57) ABSTRACT

A peeler having a blade extendible for use and retractible for compact storage, a substantially hollow handle having a forward end and a rearward end, the forward end having an enlarged blade receiving opening, the handle having opposed sides, a top and a bottom, an extendable blade holder within said handle when in a retracted position, a blade held in said blade holder, a locking mechanism for locking the blade in extended and retracted positions, a spring to automatically extend the blade, said blade holder having a forward end having a closure tip for closing the blade receiving opening, the closure tip extends downwardly beyond the blade to provide a buffer for the blade when the blade holder is extended, the handle has an ergonomic external shape for ease of use, the forward end of the handle tapering inwardly along its sides, top, and bottom for allowing the fingers of the user's hand to tightly hold the handle and more precisely manipulate the extended blade, the locking mechanism including an enlarged button on the top of the handle, the top of the handle surrounding the button being relatively flat so that the palm of the hand is out of contact with the button when the peeling blade is being used, the rearward end of the blade holder has an access opening into the handle when the blade holder is extended, a second access opening in the rearward end of the handle, said access openings providing a flow path through the handle to assist in clearing debris from within the handle when the peeler is being washed or flushed out.

9 Claims, 5 Drawing Sheets

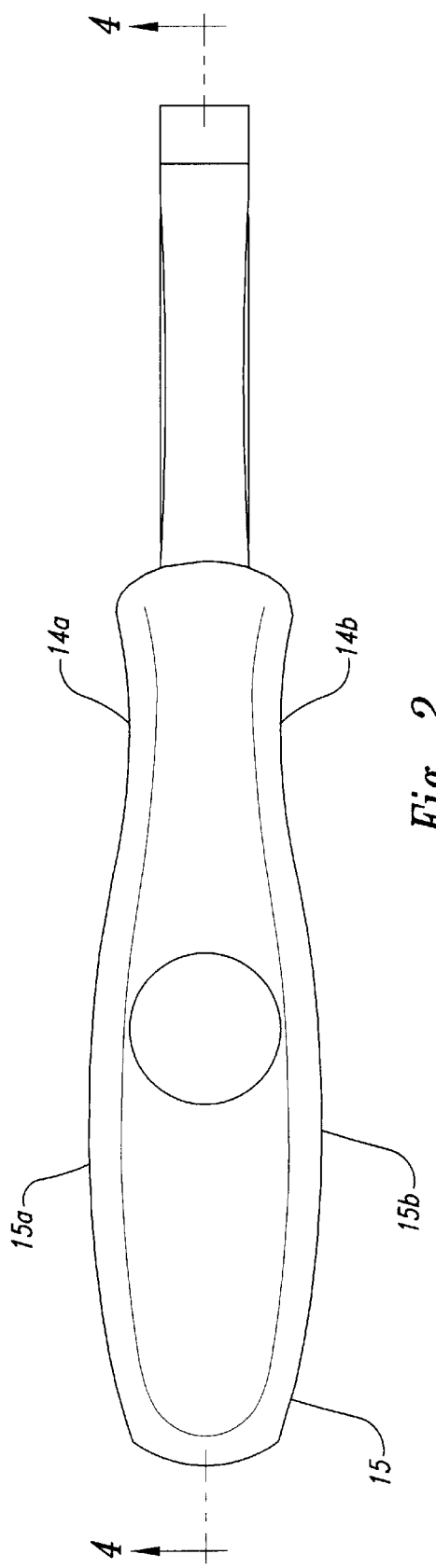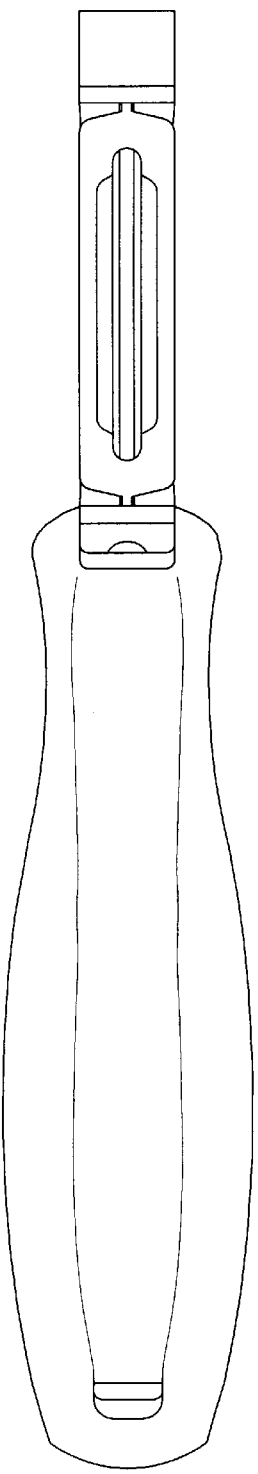
Fig. 2
Fig. 3

RETRACTIBLE PEELER

BACKGROUND OF THE INVENTION

This invention relates to cutting tools, and particularly a hand peeler for peeling the skins of potatoes or the skins of other fruits or vegetables or shaving fruits and vegetables.

SUMMARY OF THE INVENTION

There are several unique features in this application related to this invention. The first feature relates to a retractible peeler which can retract the blade for safe storage within a hollow handle and can automatically extend the blade upon the release of a locking mechanism. In the preferred embodiment, the hollow handle has an ergonomic shape with a tapered forward end so that the fingers can better control the blade while the palm and the rest of the fingers can securely hold the other end of the handle.

In one embodiment of the invention, the hollow handle is provided at one end with an opening in the blade holder to allow water to enter the hollow handle and with an opening at the opposite end of the hollow handle so that water can flush through the hollow handle, clearing any debris within the hollow handle.

Another feature of one embodiment of the invention is the provision of an enlarged rubber tip at the forward end of the blade holder, and which extends downwardly below the blade to act as a buffer when the blade is automatically extended.

While some of these features have independent utility they are best illustrated in a combined preferred embodiment which employs the ergonomic shape, the extended protected tip, and the flushing holes in the hollow handle.

BRIEF DESCRIPTION OF THE DRAWINGS

FIG. 2 is a top view of the peeler shown in the extended position.

FIG. 3 is a bottom view.

DETAILED DESCRIPTION OF THE PREFERRED EMBODIMENTS

Figure 1A:
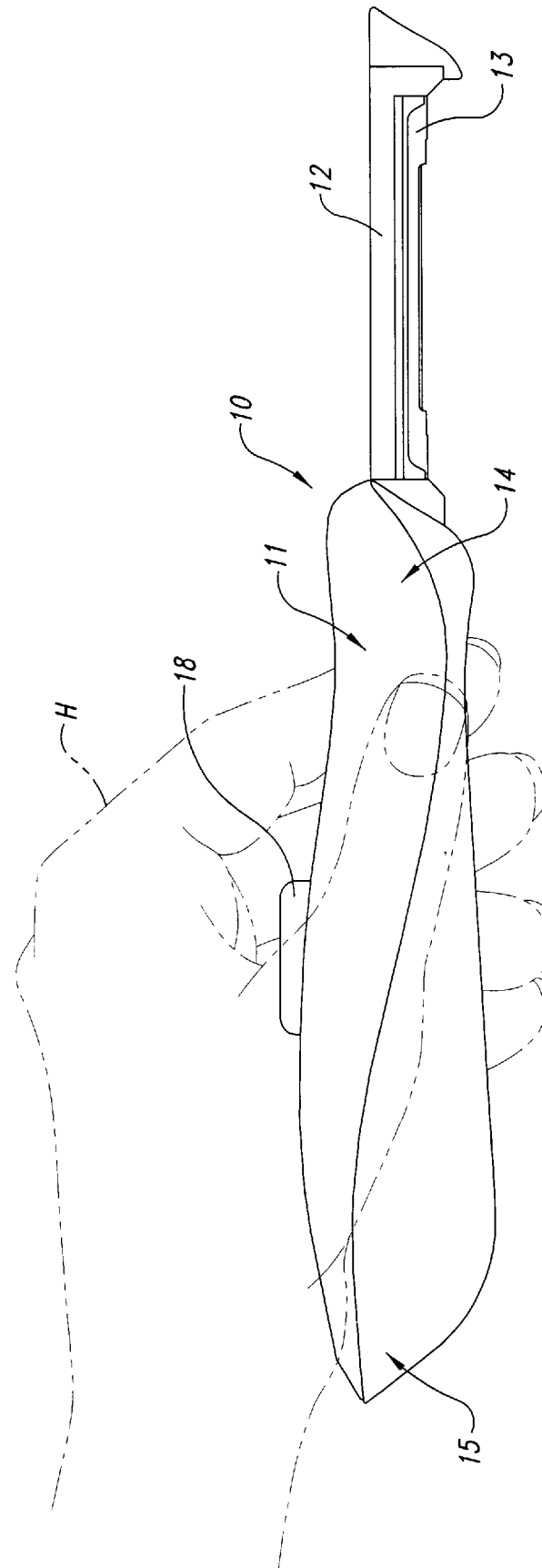
FIG. 1A is a side elevation with the blade holder extended and showing in phantom lines the position of the hand of the user.
Figure 1B:
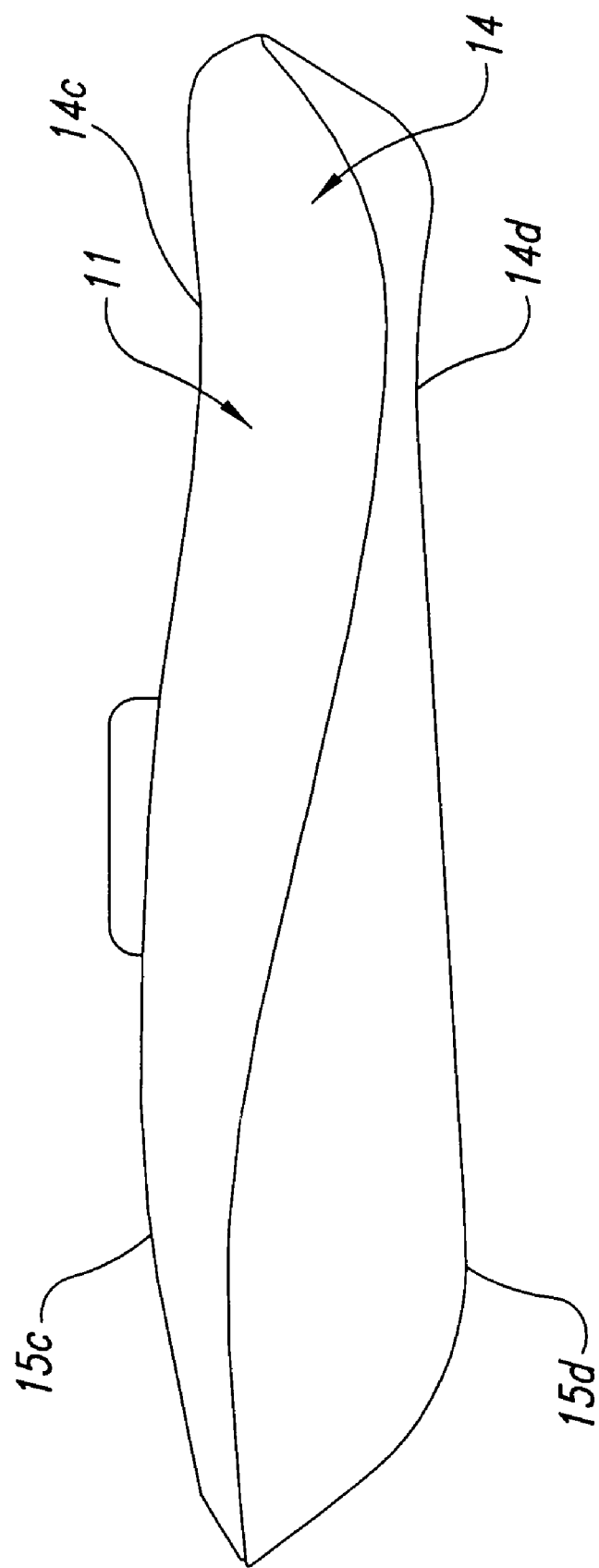
FIG. 1B shows the peeler with the blade holder in a retracted position stored in the handle.

As best shown in FIG. 1A, the peeler 10 has a hollow handle 11 with a forward end 14 and a rearward end 15. The handle is gripped in use in the shape of the position of the hand H.

The peeler has an extendible blade holder 12 shown in FIG. 1A in the extended position. The blade holder holds an elongated blade 13 of the type typically used for peeling the skins of potatoes. A locking mechanism 16 (FIG. 5B) is connected to a protruding rubber button 18. A spring 20 (FIG. 4) is connected between the hollow handle and the rearward end of the blade holder and becomes stretched when the blade holder is retracted. The spring is attached at one end to a downward post 38 on the inside of the handle and an upward post 36 on the upper surface of the blade holder 12. The spring then automatically extends the blade holder when the locking mechanism is released.

Figure 4:
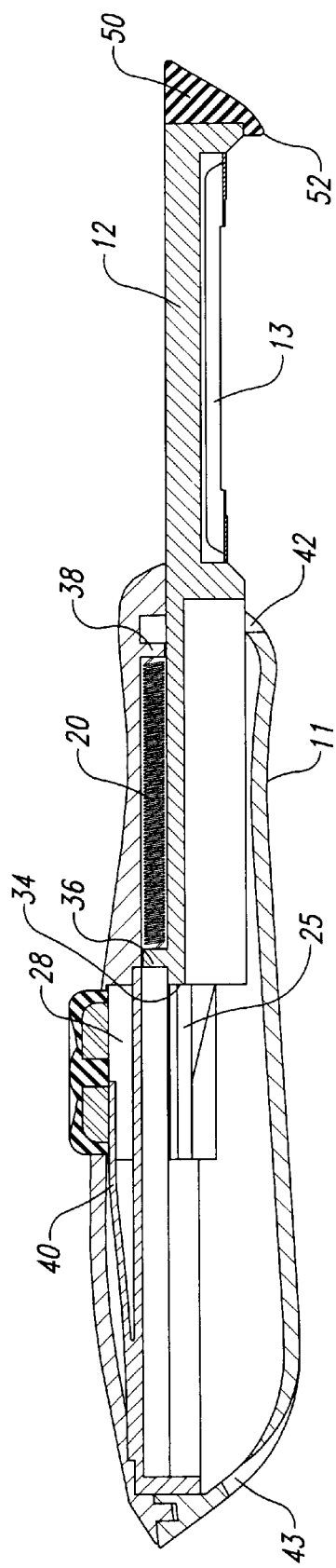
FIG. 4 is a longitudinal section taken along the line 4—4 of FIG. 2.
Figure 6:
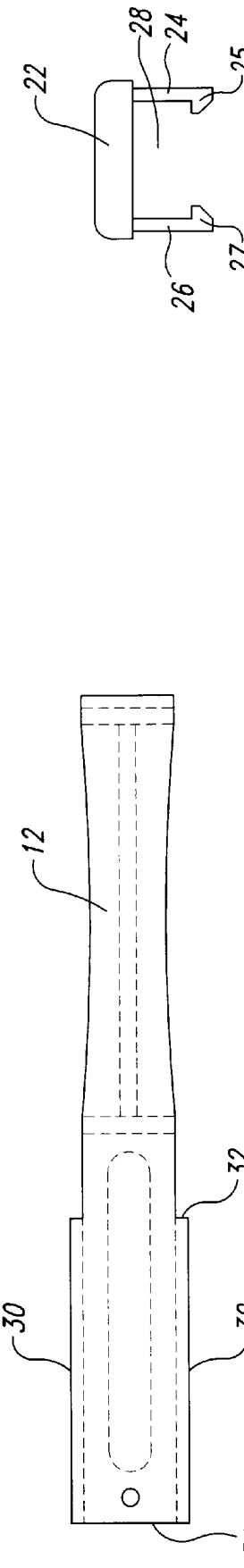
FIG. 6 is an end elevation of part of the locking mechanism of the invention.
Figure 7:
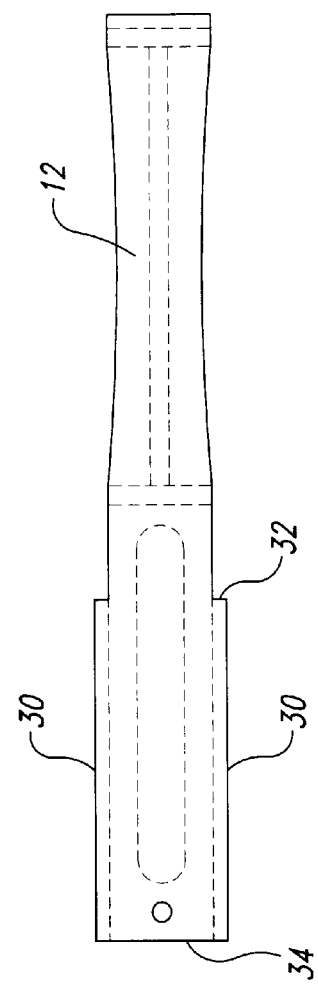
FIG. 7 is a plan view of a portion of the invention.
Figure 5A:
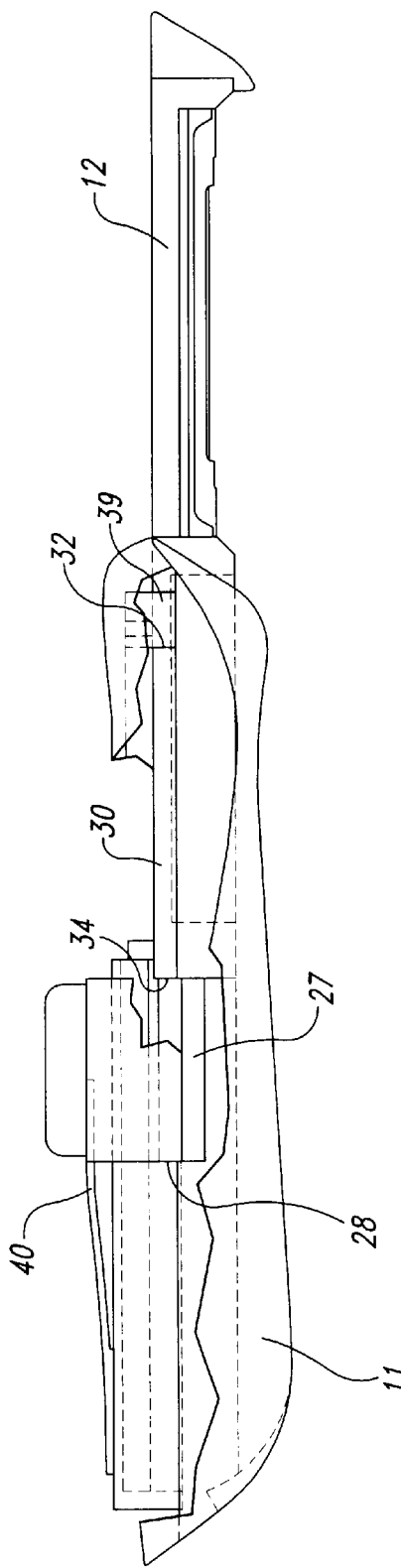
FIG. 5A is a schematic illustration with parts broken away for clarity showing how the blade is locked into an extended position.
Figure 5B:
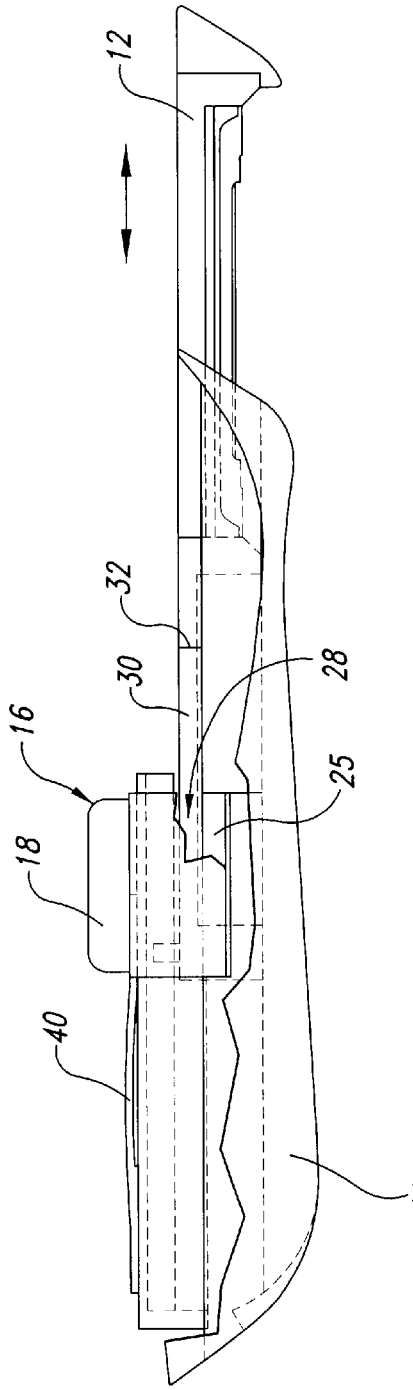
FIG. 5B is a similar view with parts broken away with the blade out of the locked position.

The locking mechanism 16 is best shown in FIGS. 4 and 6, and includes a round plate 22 having downwardly extending sidewalls 24 and 26 terminating in inwardly directing ends 25 and 27. The sidewalls provide a slot 28. The blade holder 12, as best shown in FIGS. 5A, 5B and 7, is provided with laterally extending flanges having opposite ends 32 and 34. When the button is depressed, the locking mechanism 16 is pushed down into the hollow handle. This aligns the slot 28 with the flanges 30 of the blade holder. When the slot is aligned, the ends 32 of the blade holder become released from the tips 25 and 27 of the locking mechanism allowing the spring 20 to extend the blade holder. The end 32 of the flanges then abuts against a stop 39 in the handle to stop further outward movement of the blade holder. When the button is released and the blade holder is extended, the tips 25 and 27 abut against the rear end 34 of the flanges so that the blade holder is locked in an extended position. This position is shown in FIG. 5A.

Again, by depressing the button 18 the locking mechanism is moved down as in FIG. 5B. The blade holder can then be manually pushed through the locking mechanism as the flanges 30 will be aligned in the slot 28. When the blade holder is in its fully retracted position and the button released, the locking mechanism raises and the tips 25 and 27 engage the front ends 32 of the flanges. Thus, only when the locking mechanism button is depressed into the handle and the flanges are aligned with the slot in the locking mechanism is the blade holder capable of being either extended or retracted.

A spring blade 40 holds the button and the locking mechanism, in the raised position as shown in FIG. 5A so that the locking mechanism is in a normal locking position holding either the blade holder extended or the blade holder retracted. By depressing the button, the spring blade 40 is depressed into the position shown in 5B; but when the button is released, the spring raises the button into the position of FIG. 5A.

Another unique feature of this invention is provision of a flush hole 42 (FIG. 4) at the front end of the handle and a flush hole 43 at the rearward end of the handle. When the blade is extended as shown in FIG. 4 and placed into a dishwasher or under a faucet, any food particles or other debris that may have fallen into the handle can be flushed out by directing the water flow through one of the holes so that the water then flushes out through the other hole. Since sanitation is often desired in kitchen implements, this feature assures better cleaning than in other retractible cutting devices.

The ergonomic shape of the handle is best shown in FIGS. 1A, 1B, 2, and 3. The forward end 14 of the handle is tapered inwardly at its sides 14a and 14b and again at the top 14c and at the bottom 14d. As best shown in FIGS. 1A, then the forward-most finger and thumb become more closely spaced together giving a better control of the cutting blade. At the central and rear-most portion of the handle, the sides 15a and 15b become wider and the distance between the top 15c and the bottom 15d likewise become wider so that that portion of the handle fits between the palm of the user's hand and the remaining fingers for a good, solid grip on the handle. The top 15c of the handle is a flat wall such that when in use the button 18 of the locking mechanism becomes spaced from the palm of the hand so that the button is not inadvertently depressed releasing the locking mechanism.

As best shown in FIG. 4, an enlarged rubber tip 50 is attached to the forward-most end of the blade holder. The tip has a protrusion 52 that extends down well below the blade 13. In practice the tip closes the end of the hollow handle when the blade is retracted, covering also the flushing opening 42, and the tip provides a buffer to deflect the finger away from the blade 13 if the blade holder is accidentally extended.

While the inventions have been illustrated and described in their preferred form and wherein the separate and combination features have also been described and claimed separately, it should be apparent to one of ordinary skill in the art that variations and alternative forms will be apparent that may differ from the illustration in the embodiments and the drawings. Accordingly, the invention is not to be limited to the specific form of the invention shown in the drawings.

What is claimed is:

1. A peeler having a blade extendible for use and retractible for compact storage, comprising,
    a substantially hollow handle having a forward end and a rearward end, the forward end having an enlarged blade receiving opening, the handle having opposed sides, a top and a bottom,
    an extendable blade holder within said handle when in a retracted position, a blade held in said blade holder, at least a portion of the blade holder extendable into a cutting position outside of the handle exposing the entire length of said blade,
    a locking mechanism for locking the blade in said extended and retracted positions,
    a spring within the handle to automatically extend the blade when the locking mechanism is released,
    said blade holder having a forward end and a rearward end, the forward end having a closure tip for closing the blade receiving opening when the blade holder is retracted.

2. The peeler of claim 1, wherein said handle has an ergonomic external shape for case of use, the forward end of the handle tapering inwardly along its sides, top, and bottom for allowing the fingers of the user's hand to tightly hold the handle and more precisely manipulate the extended blade, the locking mechanism including an enlarged button on the top of the handle, the top of the handle surrounding the button being relatively flat so that the palm of the hand is out of contact with the button when the peeling blade is being used.

3. The peeler of claim 1, wherein said closure tip extends downwardly beyond the blade in the blade holder to provide a buffer for the blade when the blade holder is extended.

4. The peeler of claim 1, wherein the rearward end of the blade holder has an access opening into the handle when the blade holder is extended, a second access opening in the rearward end of the handle, said access openings providing a flow path through the handle to assist in clearing debris from within the handle when the peeler is being washed or flushed out.

5. The peeler of claim 2, said blade holder having a set of opposed flanges, said locking mechanism including a slot for slidably receiving the opposed flanges on said blade holder when the slots and the flanges are aligned, the slots being movable into a misaligned position so that the flanges abut the locking mechanism to lock the blade holder in the retracted or extended positions.

6. The peeler of claim 5, said blade holder having an upwardly protruding holder post, said spring having one end attached to said post, said handle having a downwardly protruding handle post, the other end of the spring attached to said handle post.

7. The peeler of claim 6, wherein said closure tip extends downwardly beyond the blade in the blade holder to provide a buffer for the blade when the blade holder is extended.

8. A peeler having a blade extendable for use and retractible for compact storage, comprising,
    a substantially hollow handle having a forward end and a rearward end, the forward end having an enlarged blade receiving opening, the handle having opposed sides, a top and a bottom,
    an extendable blade holder within said handle when in a retracted position, a blade held in said blade holder, at least a portion of the blade holder extendable into a cutting position outside of the handle into an extended position exposing the entire length of said blade,
    a locking mechanism for locking the blade in said extended and retracted positions,
    the rearward end of the blade holder having an access opening into the handle when the blade holder is extended, a second access opening in the rearward end of the handle, said access openings providing a flow path through the handle to assist in clearing debris from within the handle when the peeler is being washed or flushed out.

9. A peeler having a blade extendable for use and retractible for compact storage, comprising,
    a substantially hollow handle having a forward end and a rearward end, the forward end having an enlarged blade receiving opening, the handle having opposed sides, a top and a bottom,
    an extendable blade holder within said handle when in a retracted position, a blade held in said blade holder, at least a portion of the blade holder extendable into a cutting position outside of the handle into an extended position exposing the entire length of said blade,
    a locking mechanism for locking the blade in said extended and retracted positions,
    said blade holder having a forward end and a rearward end, the forward end having a closure tip for closing the blade receiving opening when the blade holder is retracted, said closure tip extending downwardly beyond the blade in the blade holder to provide a buffer for the blade when the blade holder is extended.

* * * * *